Patented Mar. 11, 1941

2,234,646

UNITED STATES PATENT OFFICE 2,234,646

WATER RESISTANT ALKALI SILICATE COMPOSITION

Chad H. Humphries, Glencoe, Ill., assignor to Insolna Corporation, New Orleans, La., a corporation of Louisiana No Drawing. Application August 15, 1938, Serial No. 224,965

1 Claim. (Cl. 134—11)

This invention is directed to new and useful improvements in water resistant alkali silicate composition.

The primary object of this invention is to provide an improved silicate composition that when applied to various materials such as paper, paper products, textiles, wood, and the like, will preserve such materials and will give them preservative coatings that are insoluble in water, smooth and hard, oil and grease resistant, permanently adherent and flexible, and capable of being colored.

Heretofore water glass solutions have been used for the coating, saturation, or impregnation of materials such as paper, paper products, textiles, wood products, and the like, but such compositions were not water resistant and were readily acted upon by the carbon dioxide and moisture of the air so that they readily decomposed leaving the material without protection. Also such prior compositions have been very brittle upon drying and therefore readily cracked, thus furnishing a direct entrance for moisture and water to the material sought to be protected.

The silicate solution herein disclosed provides a coating protection which is not acted upon by the air or moisture, is permanently flexible and insoluble in water.

Furthermore such solution maintains its adhesive qualities which further increases its value in affording adequate protection to such products as have been mentioned.

I am aware of the fact that attempts have been made to provide water insoluble silicate compositions for similar purposes such, for example, as described in United States Letters Patent No. 1,832,752 to Thoretz, but the mere addition of formaldehyde to the water glass solution in order to render the subsequent coating insoluble in water is insufficient to give the articles treated with such solutions adequate protection. In addition to the fact that such a solution may be rendered insoluble in water, it is essential that the resultant coatings or films be permanently flexible and adherent. Furthermore such a film to give efficient protection must maintain its characteristics after setting or in other words must not be susceptible to decomposition upon exposure to the air or water.

I have discovered that the addition of certain soluble salts and a flexibilizing agent to the usual and well known water glass formaldehyde solution produces a composition that when applied to materials as above set forth will give, upon setting, a coating or film that is permanently flexible, adherent and completely resistant to air or water.

The specific and preferred formula which I have discovered is as follows: One-half gallon commercial water glass 40° to 42° Baumé, one-half gallon of water, one to six liquid ounces of formaldehyde (commercial), from one-third to one and one-half ounces of sodium aluminate solution comprising substantially 30% solid sodium aluminate, and from one to three ounces of sodium abietate.

The above composition is thoroughly stirred and when applied to a material which is desired to be protected and properly hardened will produce a film having the above set forth characteristics. As is well known the formaldehyde acts as a smoothening and hardening agent. The sodium aluminate upon drying or hardening provides an insoluble aluminum silicate which with the sodium silicate provides a double insoluble silicate which increases the efficiency of the composition. The sodium abietate is the flexibilizing agent.

The formaldehyde can be replaced with another of the aldehydes or various other organic compounds such as sucrose, dextrose, dextrine, urea, para-formaldehyde, carbonates of alkali metals, soluble chlorides and the like.

The sodium aluminate has for its equivalents soluble salts of calcium or magnesium such as calcium chloride, calcium saccharate, magnesium chloride, and magnesium sulphate. These salts are added to the silicate solution in amounts insufficient to form a gel.

Other flexibilizing agents than sodium abietate can be used such as any of the salts of abietic acid, a resin soap, casein, gelatin, or latex.

In applying this composition to the materials sought to be treated, it is important that they be freed of all prior sizings before the protective composition is applied. If it is known that the material has been first treated by a sizing, such sizing should be removed by an appropriate alkaline cleaner and the material then dried. An immersion of such material in the above solution will suffice to saturate it to some extent and upon being removed from the solution and being subjected to quick drying under heat and pressure, the material will be efficiently protected.

However, highly desirable and practical results are obtained that may in some cases be commercially advantageous in subjecting the material to be treated to a series of baths in the various ingredients used to make up the above given formula, drying and heating between such baths and then being allowed to set. I have found that in so treating fabrics, textiles, wood, wood products, and the like, that the various elements making up this formula combine to form a resultant protective coating or film having the desirable characteristics set forth. I also find that by treating the materials in question by the series of baths, as I will hereinafter set forth, that the resultant protective composition impregnates the material so treated so that it is permanently and efficiently protected.

It is of course preferred to treat materials which have not been subjected to any prior sizing operation.

If the material has been so treated the prior sizing must be removed with a suitable alkaline cleaner and thoroughly rinsed out.

Either the material that has been cleansed of its prior sizing or the unsized material is first immersed in a solution of a salt of aluminum, such as sodium aluminate or its equivalents as above set forth.

The material being treated is then passed through a hot roller and is then immersed in a modified silicate solution comprising water glass and formaldehyde or a similar hardening agent. The material being treated is again passed through a hot roller.

The next step is to immerse the material in a solution containing a flexibilizing agent such as sodium abietate, a resin soap, a casein, or a gelatine, or latex.

The material being treated is again passed through a hot roller and into a drying or ageing chamber which is enriched with either ammonia or carbon dioxide.

The material is allowed to remain in the drying chamber a sufficient length of time for the preserving composition to properly set.

After it has been allowed to remain in the drying chamber a sufficient length of time it is removed and again passed through a hot roller and then wound upon an appropriate roller for storage purposes until needed.

The first or sodium aluminate bath, or its equivalent, should comprise substantially 30% solid sodium aluminate.

The modified silicate solution in which the material is next immersed should comprise water glass, water and formaldehyde in substantially the following proportions.

| Water glass | gallon | ½ |
| Water | do | ½ |
| Formaldehyde | ounces | 1 to 6 |

The flexibilizing or sodium abietate solution should comprise substantially the following:

| Water | gallon | 1 |
| Sodium hydroxide | ounces | 14 |
| Abietic acid | do | 6 |

If latex is used as the flexibilizing agent it can be thinned or used as a concentrated dispersion.

The length of immersion in the various baths should be sufficient for the solution to substantially saturate the material being treated. In the case of fabrics attention must be given to the firmness or tightness of the weave, it being obvious that the looser the weave the quicker the material will be saturated with the solution.

The amount and thickness of the coating is readily determined, using a suitable test, usually a color test, which will indicate the continuity of the coating, for example on paper or paper board the solution of an oil soluble dye in benzol or toluol applied locally to a smaller area and removed by rubbing a piece of cotton thereon will show whether the dye coating is continuous and perfected.

Sufficient heat must be applied to the hot rollers to completely dry the material passed therethrough.

The water insoluble silicate coatings obtained in following my invention as herein described are suitable for treating containers for food inasmuch as they are non-toxic and can in no way injuriously combine with or affect edibles.

I claim:

A water resistant alkali silicate coating composition consisting essentially of water glass, water, formaldehyde, a 30% sodium aluminate solution and sodium abietate in substantially the proportions of about one-half gallon water glass, one-half gallon water, 1 to 6 ounces formaldehyde, one-third to one and one-half ounces sodium aluminate solution and 1 to 3 ounces sodium abietate.

CHAD H. HUMPHRIES.